July 4, 1944.  J. W. ARMBRUSTER  2,353,002
DISPENSING AND TABULATING MACHINE
Filed June 9, 1938  10 Sheets-Sheet 1
FIG. 1.
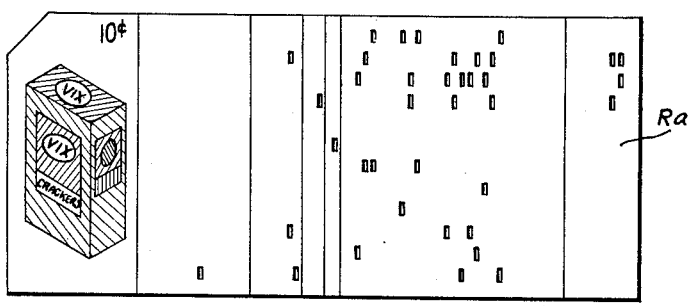
FIG. 2.
FIG. 2a.
FIG. 2b.
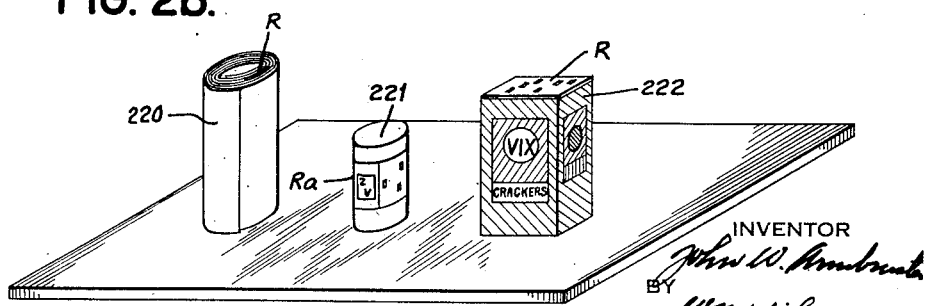
INVENTOR
John W. Armbruster
BY
W. M. Wilson
ATTORNEY July 4, 1944.   J. W. ARMBRUSTER   2,353,002
DISPENSING AND TABULATING MACHINE
Filed June 9, 1938   10 Sheets-Sheet 2

INVENTOR
John W. Armbruster
BY
ATTORNEY

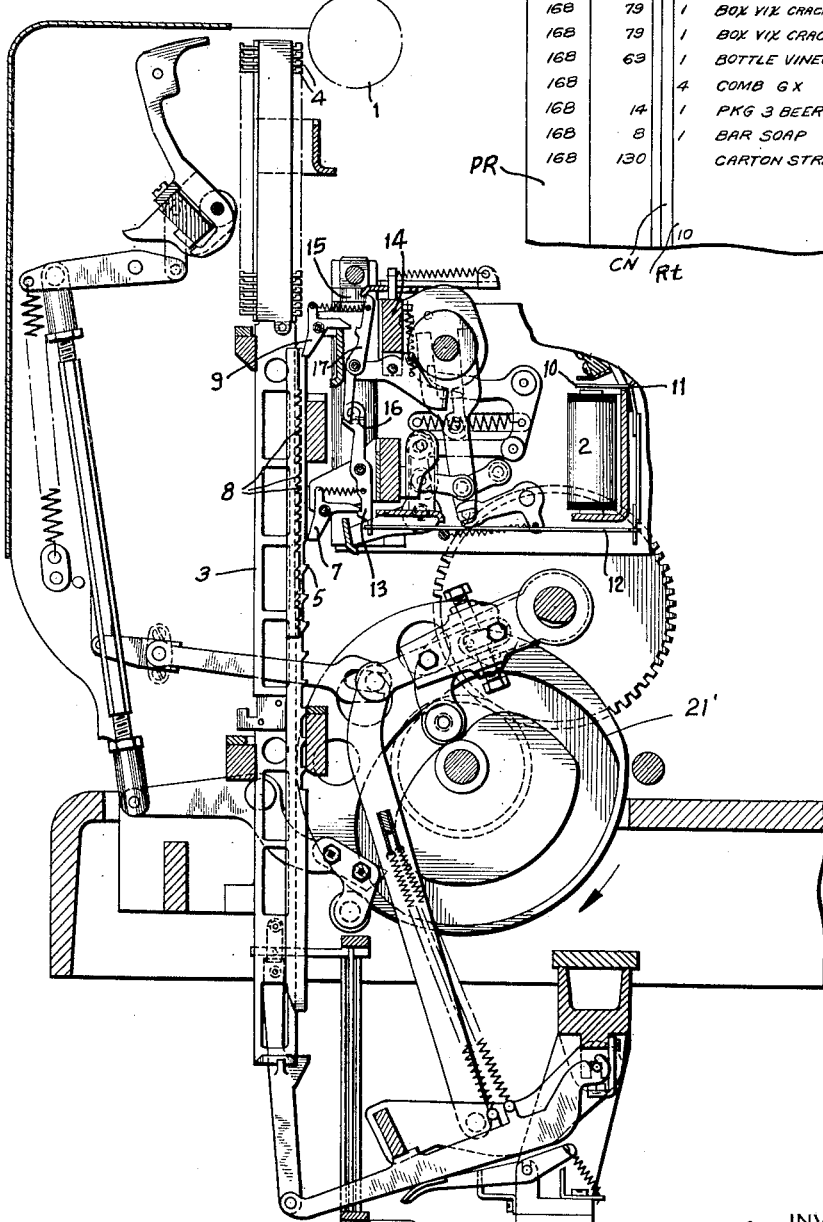

July 4, 1944. J. W. ARMBRUSTER 2,353,002
DISPENSING AND TABULATING MACHINE
Filed June 9, 1938 10 Sheets-Sheet 4
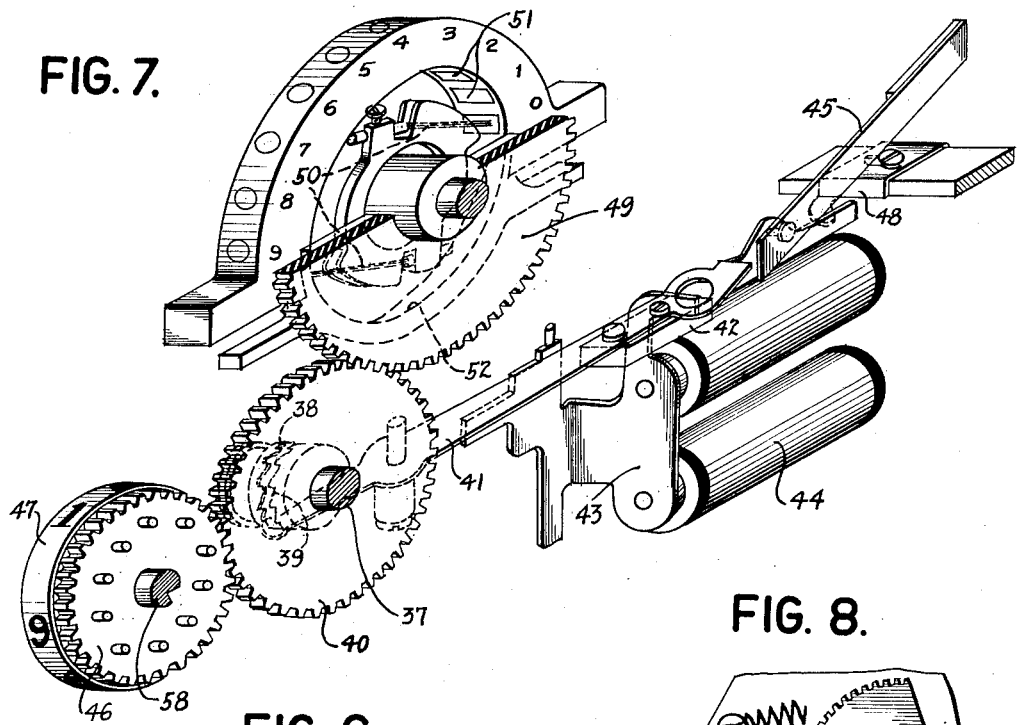
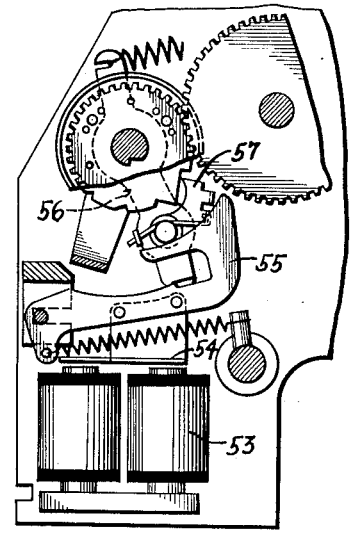
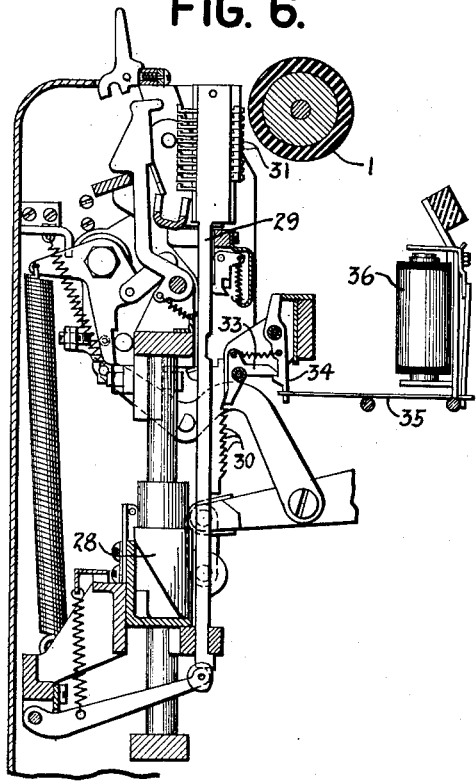
INVENTOR
John W. Armbruster
BY
W. M. Wilson
ATTORNEY July 4, 1944.  J. W. ARMBRUSTER  2,353,002
DISPENSING AND TABULATING MACHINE
Filed June 9, 1938    10 Sheets-Sheet 5

INVENTOR
John W. Armbruster
BY
W. M. Wilson
ATTORNEY

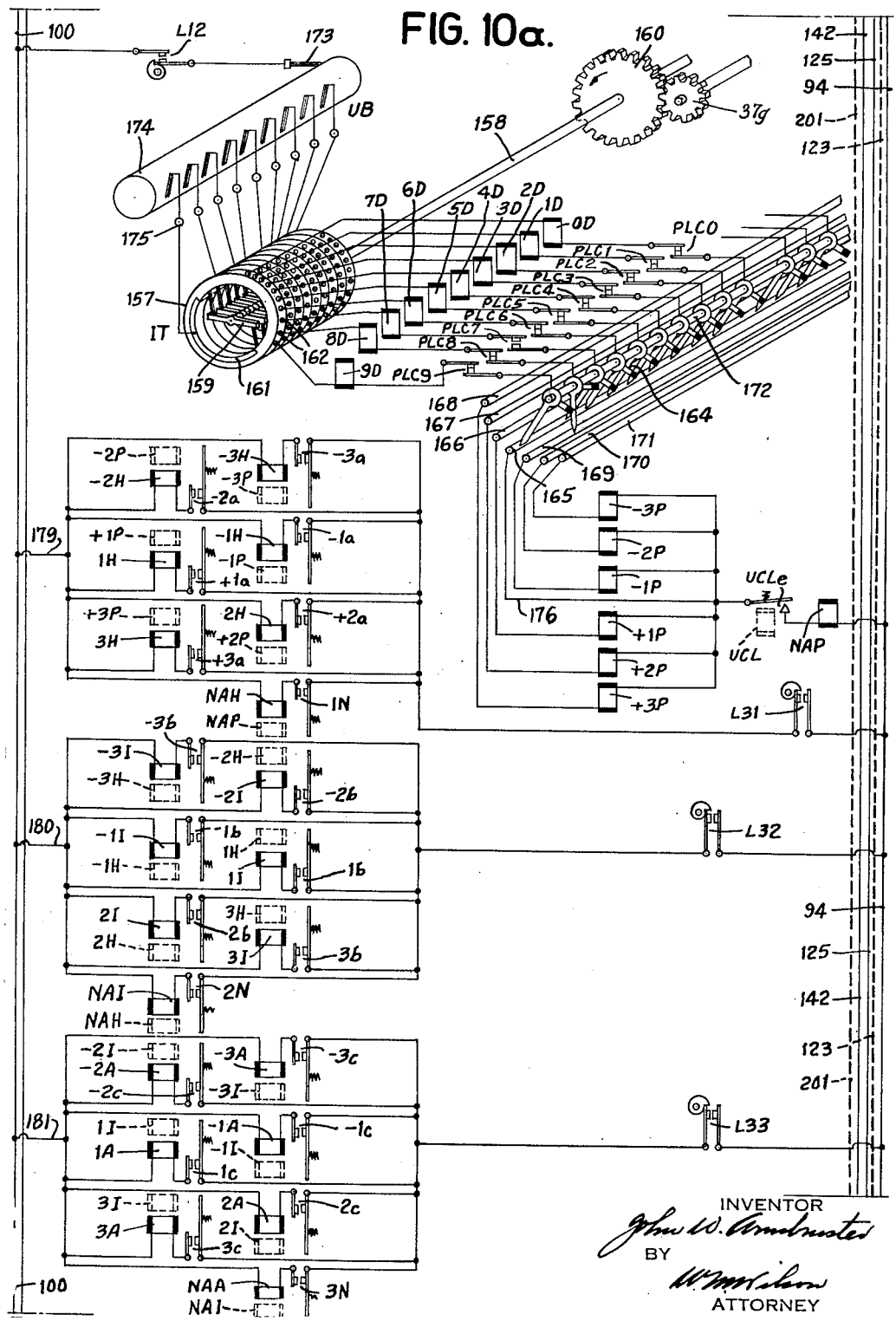

July 4, 1944.  J. W. ARMBRUSTER  2,353,002
DISPENSING AND TABULATING MACHINE
Filed June 9, 1938  10 Sheets-Sheet 7

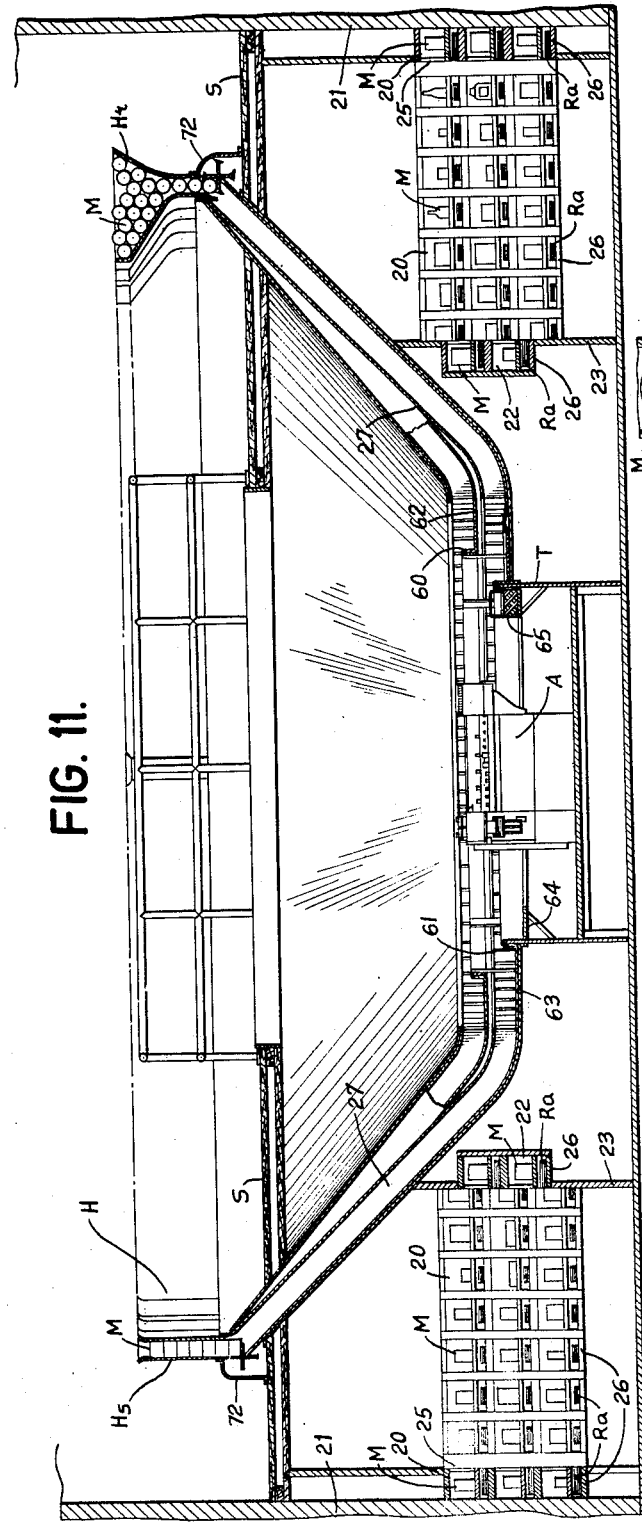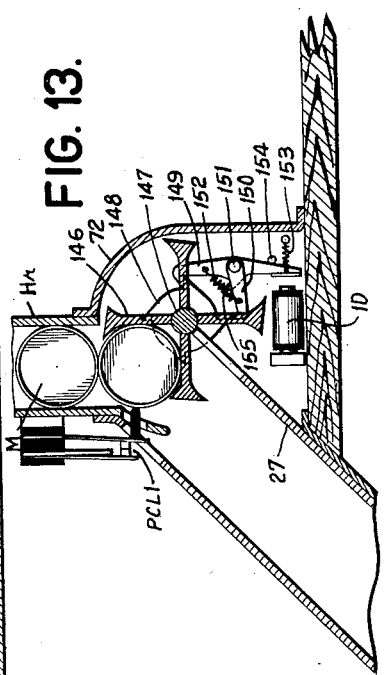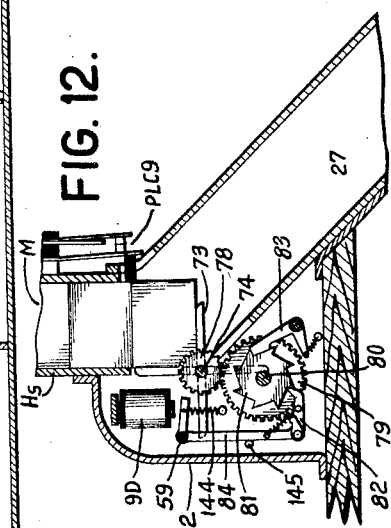

Patented July 4, 1944

2,353,002

UNITED STATES PATENT OFFICE 2,353,002

DISPENSING AND TABULATING MACHINE

John W. Armbruster, East Rockaway, N. Y., assignor to International Business Machines Corporation, New York, N. Y., a corporation of New York Application June 9, 1938, Serial No. 212,678

10 Claims. (Cl. 235—61.8)

This invention relates generally to devices for automatically retailing merchandise and more particularly such devices controlled by perforated record cards.

The main object of the invention is to store different kinds of articles in a series of hoppers or other dispensing structures and selectively operate said dispensing means under control of tokens, such as record cards bearing indicia related to the various articles.

Another object of the invention is the provision of a series of hoppers with electrical connections to a card controlled accounting machine whereby indicia on cards may be sensed to control selectively the operation of the hoppers and the delivery of merchandise therefrom at the same time that amount adding and identification printing operations are taking place.

Another object of the invention is the provision of an improved retail store system wherein neither the customer nor the clerk withdraws articles from stock manually but such operation is carried on automatically by a system of dispensing hoppers and chutes controlled by record cards selected by the customer.

Another object of the invention is the provision of an improved retail store system wherein a small store on the ground floor is devoted only to displaying and packaging facilities while the storage of the main stock of merchandise is held in a larger upper room. Articles are brought down to a central point in the store by means of hoppers and converging slides; said hoppers being operated automatically by card controlled devices on the lower floor.

A feature of the invention is the display of only one article of a kind in a retail store and the association therewith of a plurality of tokens or record cards, each of which represents the article with which it is associated so that a customer may select one or more tokens related to each of the articles of merchandise which he desires to purchase. These tokens are used to automatically operate dispensing devices for withdrawing the actual articles from stock and bringing them together at a central point so that they may be wrapped together.

Another object of the invention is the provision of means whereby the proprietor may vary the price of the articles which are dispensed automatically by tokens. Each token or record card bears indicia representing the price of the article. These indicia or representations of a standard price remain fixed on the record, but the machine sensing such indicia is provided with adjustable means for varying the amount added, printed, and charged. This price variation may be changed a few cents in either direction to make the article cost slightly more or to sell the article at a sales price for a reduced figure. Individual price variation controls are provided whereby the proprietor may move the price of any article either up or down. These price variations are automatically taken into account during the accumulation of the total to be charged and they are also recorded on a customer's receipt and a proprietor's record sheet.

Another object of the invention is the provision of means for making a complete printed record under control of the dispenser operating record cards selected by a customer for purchasing an assortment of merchandise. The cards are sensed by an accounting machine which prints complete records for the proprietor and a receipt for each customer at the same time that it operates the hoppers to dispense the articles. The customer's receipt reveals the number of articles purchased, the name of the article, price, price variation, the total number of articles and the total price. The proprietor's printed record contains all the information printed on the receipts and in addition thereto carries numbers representing a customers charge number and the designation of the articles purchased so that a check may be had over an inventory of the stock. Of course, the sensed cards are also a check on the kinds and quantity of merchandise sold. At the end of each day, all sensed cards may be sorted and tabulated to determine how the stock may be replenished.

A still further object of the invention is the provision of novel non-add and non-print control devices which depend for operation on the presence or absence of articles of merchandise in the hoppers. The tokens usually control the addition of the price and quantity, and the printing of the identification, price and quantity relating to the article which the token is supposed to select. However, when such articles are out of stock and the hoppers from which they are supposed to be dispensed are empty, the machine automatically suspends the accumulation of quantity and price and also the printing of such items. The printing of the missing article's identification number and name is parmitted to take place so that the customer is made aware that a certain article which he has ordered has not been received, and the proprietor is informed that the same article is out of stock.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 shows a record card perforated to select an article of merchandise;

Fig. 2 is a view showing a record card containing a pictorial representation of an article and its price in addition to indicia on the record which is to be sensed to control selection of the article;

Fig. 2a shows a record card perforated to select a combination of four different articles simultaneously;

Fig. 2b shows how articles may be wrapped with perforated record cards;

Fig. 4 is an elevation view showing an alphabet printing device;

Fig. 5 shows samples of the printed record strips;

Fig. 6 is an elevation view showing the numeral printing devices;

Fig. 7 is a perspective view showing one order of the accumulating devices;

Fig. 8 is a sectional elevation view of the units order carrying devices with an elusive unit entry magnet associated therewith;

Figure 14:
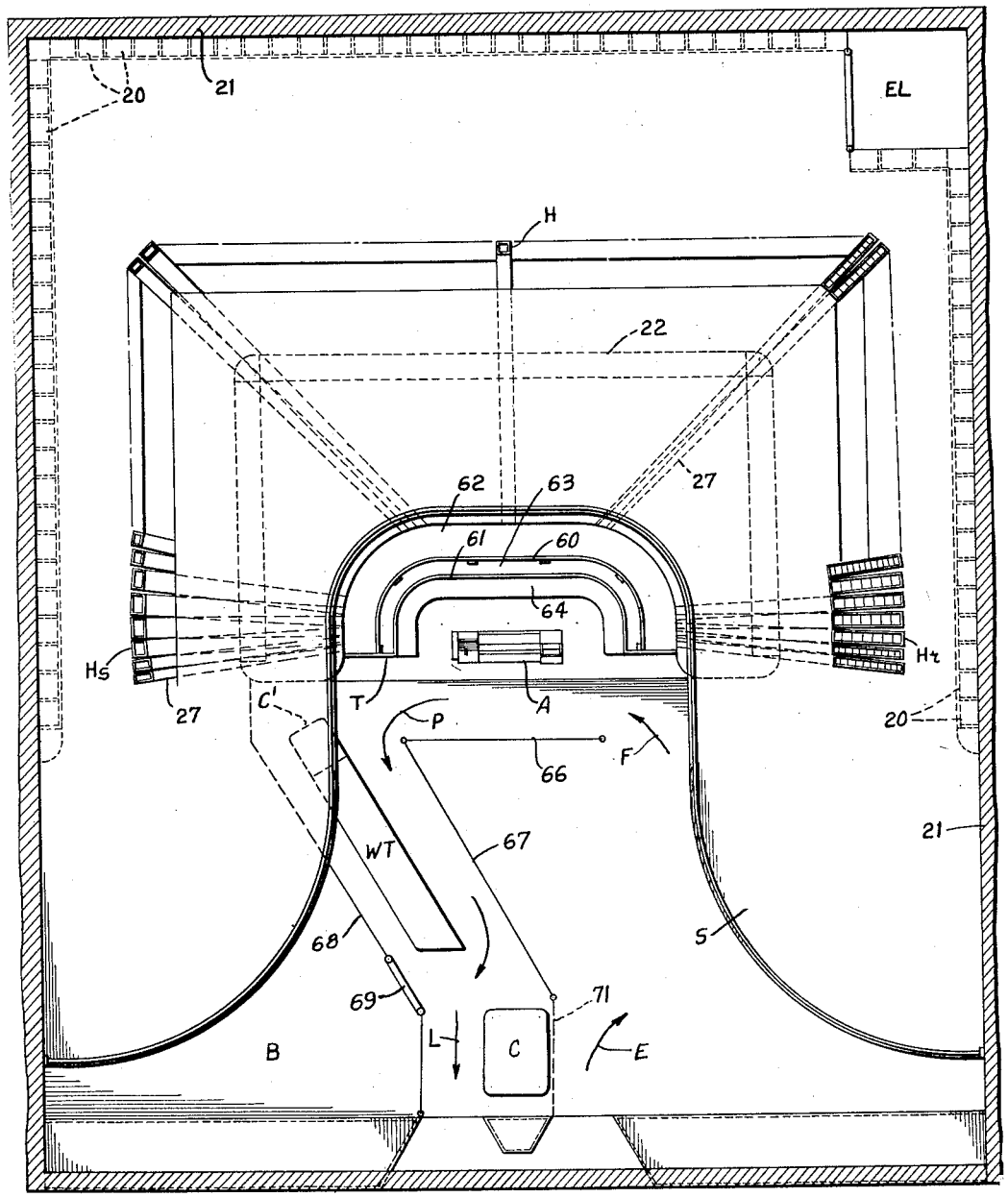

Figs. 10, 10a, 10b, and 10c are a wiring diagram of the machine;

Fig. 11 is a front elevation view partly in section showing a retail store arranged according to the present invention;

Fig. 12 is a detail sectional view revealing the operating end of a hopper constructed to handle square and rectangular packages;

Fig. 13 is a detail sectional view showing the operating end of a hopper designed to dispense round objects such as cans;

Fig. 14 is a plan view of the store shown in Fig. 11.

The machine to which the features of the present invention are applied is similar in some respects to that shown in the copending application of G. F. Daly, Serial No. 704,768, filed December 30, 1933, now Patent 2,126,621, issued August 9, 1938, and Patent 1,976,617, issued October 9, 1934. These patents illustrate and explain in more detail the arrangement of mechanism and mode of operation of a well-known type of electrical accounting machine. The accumulating and numeral printing devices and electrical controls therefor shown in the present case are of a kind generally the same as those in Patent 2,126,621. Whenever possible, elements in the present case, corresponding to similar parts shown in the patents are designated with the same reference characters. In the present application the various mechanisms will be explained in only as much detail as is necessary to point out how the objects of the invention may be realized.

The record card shown in Fig. 1 is of the usual form provided with 80 vertical columns of index point positions, each column containing twelve positions for perforations. The left border of the card is marked 0–9 showing the positions relating to the numerical identification data. Above the zero row of perforations are two other rows of control index points which may be perforated either for use to effect special controls in the machine or to control alphabet printing. The special perforations in columns 22, 79 and 80 are used to effect transferring of amounts from one accumulator to another, while the special perforations in the "Name" field are used for controlling alphabet printing. The card is divided into a number of other fields for effecting various adding, printing and article selection control when sensed by the devices in the accounting machine.

Discussing the various fields of the card as they occur from left to right in Fig. 1, the first "article selection field" is devoted to a series of rows of possible perforation positions with a single perforation which controls the operation of a certain hopper to select and dispense the article represented by the card. The second field controls the printing of the number of the article on the proprietor's record sheet. The third field contains a perforation in the units position to denote the quantity represented by the card. The fourth field contains a group control perforation which is the same for all cards, so that total printing and resetting of the accounting machine is suspended until the group of cards which the customer has selected has passed through the accounting machine. The fifth field on the card is perforated with alphabetical code designations for controlling the printing of the name of the article on the receipt and proprietor's record sheet. The field at the right of the card contains price indicia representing amounts which are added and printed on the records.

Fig. 2 shows a record card $Ra$ which is similar in most respects to the ordinary card R discussed in connection with Fig. 1. However, this other form of record in addition to all the information represented by the indicia perforated thereon also carries a picture of the article represented by the card. This picture is placed on the card in view of the fact that most people are unable to read the alphabet code perforations found in the "Name" field on the card. This picture card $Ra$ dispenses with the usual need for perforation interpretation printing such as that placed on the top line of card R. It also aids in a quick identification of cards that are misplaced or thrown aside when the customer changes his mind. Such cards may be used without associating them with samples of the articles they represent, because the pictures thereon show what they represent.

Figure 10:
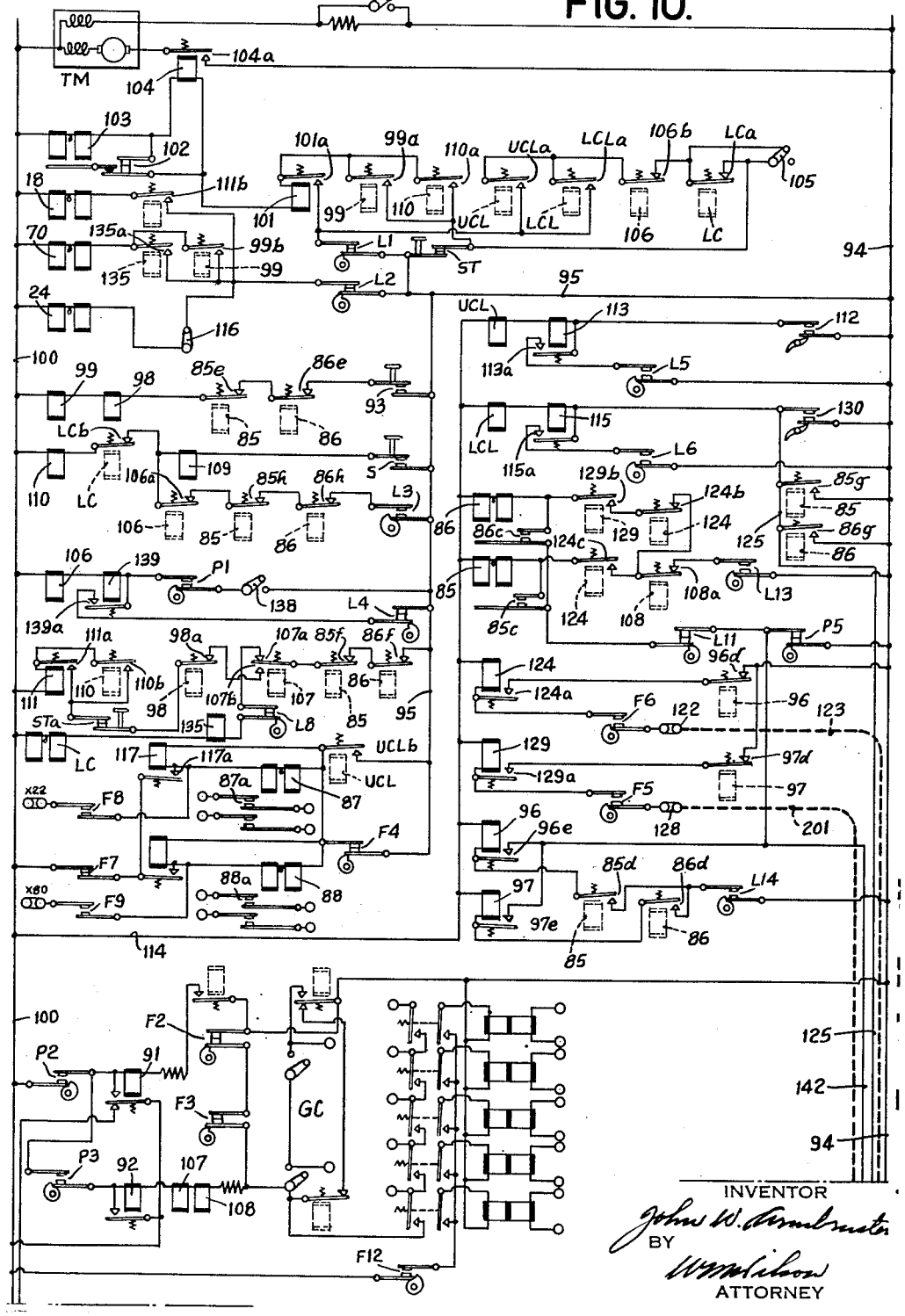
Figure 10B:
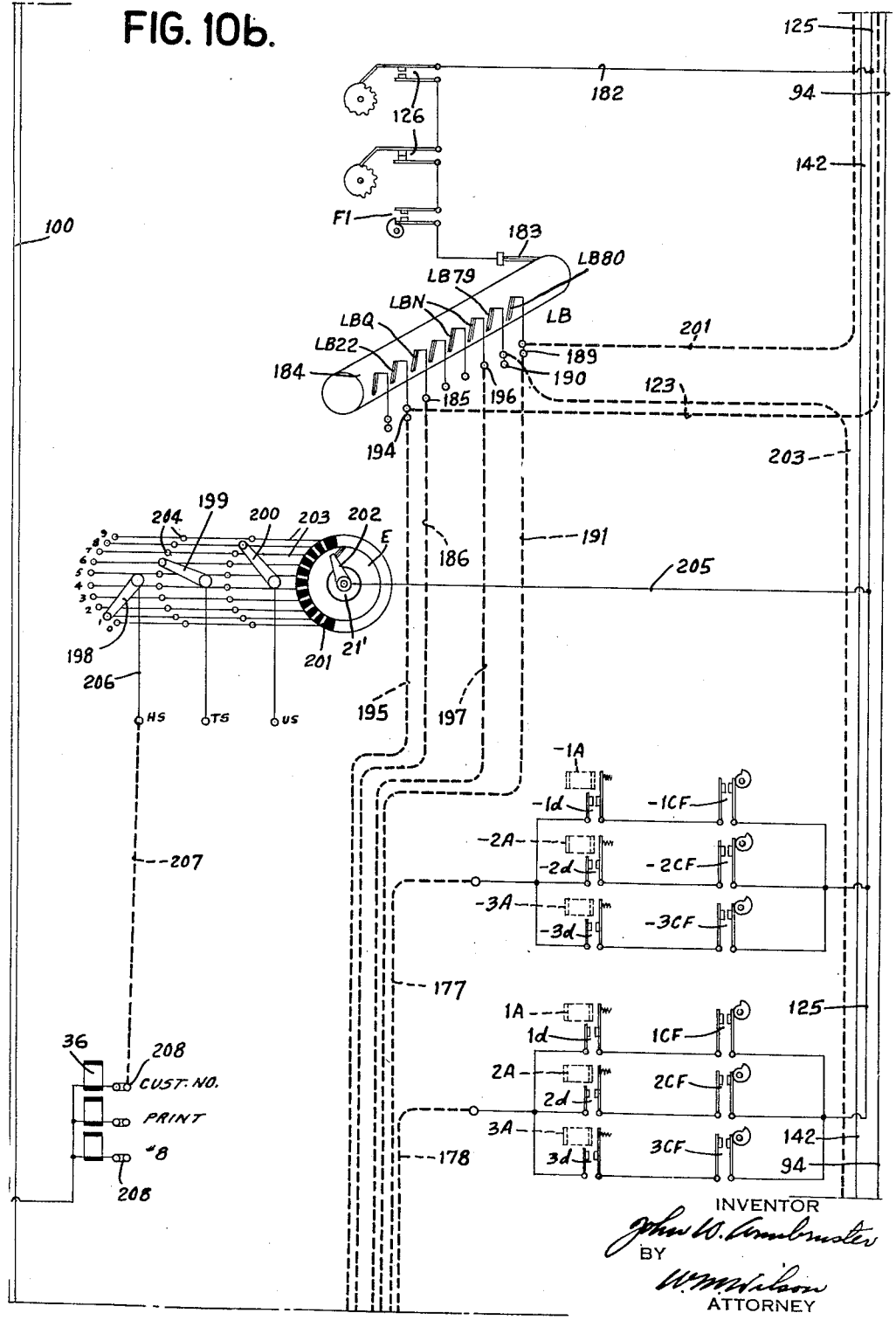

The cards are fed in the usual way in the electrical accounting machine so that they pass in succession, first under a set of upper brushes UB (Fig. 10a) and one cycle later under a set of lower brushes LB (Fig. 10b). As a card passes under the brushes, the article selection perforation is sensed to control the operation of the related hopper and at the same time the group control column of perforations is sensed to compare the card with the previously fed card, then one cycle later all the other fields on the card are sensed to control printing of the various features of the article and also addition of the price and quantity of the article selection.

Fig. 2b shows the record cards R and $Ra$ associated with, or forming part of, the wrapping of different articles of merchandise. There it is seen that the card may be wrapped in one of the inner windings of a paper roll 220, or it may form part or all of a label on the can 221, or it is part of, or attached to, the carton 222. When these articles are used, the cards may be put aside, not only as reminders to order similar articles, but also as the actual controls of article selection which may be taken to the store and used to control the dispensing mechanism.

The name printing portion of the electric accounting machine is similar to the devices set forth in Patent 1,965,980 issued July 10, 1934. This part of the printer is controlled by the perforations in the "Name" field which is the second field from the right on the cards shown in Figs. 1 and 2. In order that the twenty-six letters of the alphabet may be represented by only twelve index positions of a column, the letters are represented by code perforations with two perforations in each column devoted to alphabetic data. These perforations are sensed by a lower brush LB with connections to an alphabet print controlling magnet 2, Fig. 4. Associated with each magnet 2 is an alphabet type bar 3 containing type 4 representing the different letters. These bars 3 are reciprocated vertically and stopped in printing position opposite the platen 1 as controlled by the card and magnet 2. The type bars are raised in synchronism with the passage of the card under the lower brushes and each type bar 3 is provided with a series of stops 5 which are adapted to be engaged by a stopping pawl 7. Each type bar is also provided with a series of stops 8 which are adapted to cooperate with a stopping pawl 9 located above the other stopping pawl 7, the two pawls related to any type bar being offset so that each will cooperate with its own set of stops. These stops are arranged in accordance with the location of the numerical index point positions on the record cards and interruption of any stop 5 by engagement with pawl 7 will position the corresponding type 4 at the printing line of the platen 1.

Arrival of the initial name perforation at the lower brush allows it to close a circuit to the magnet 2 to stop the type bar 3 in position to present an alphabet type, corresponding to the location of the perforation, at the printing line. This operation is in accordance with the usual method of locating the type bars for the purpose of printing numerals under control of a single perforation in a column on the record card.

Figure 10C:
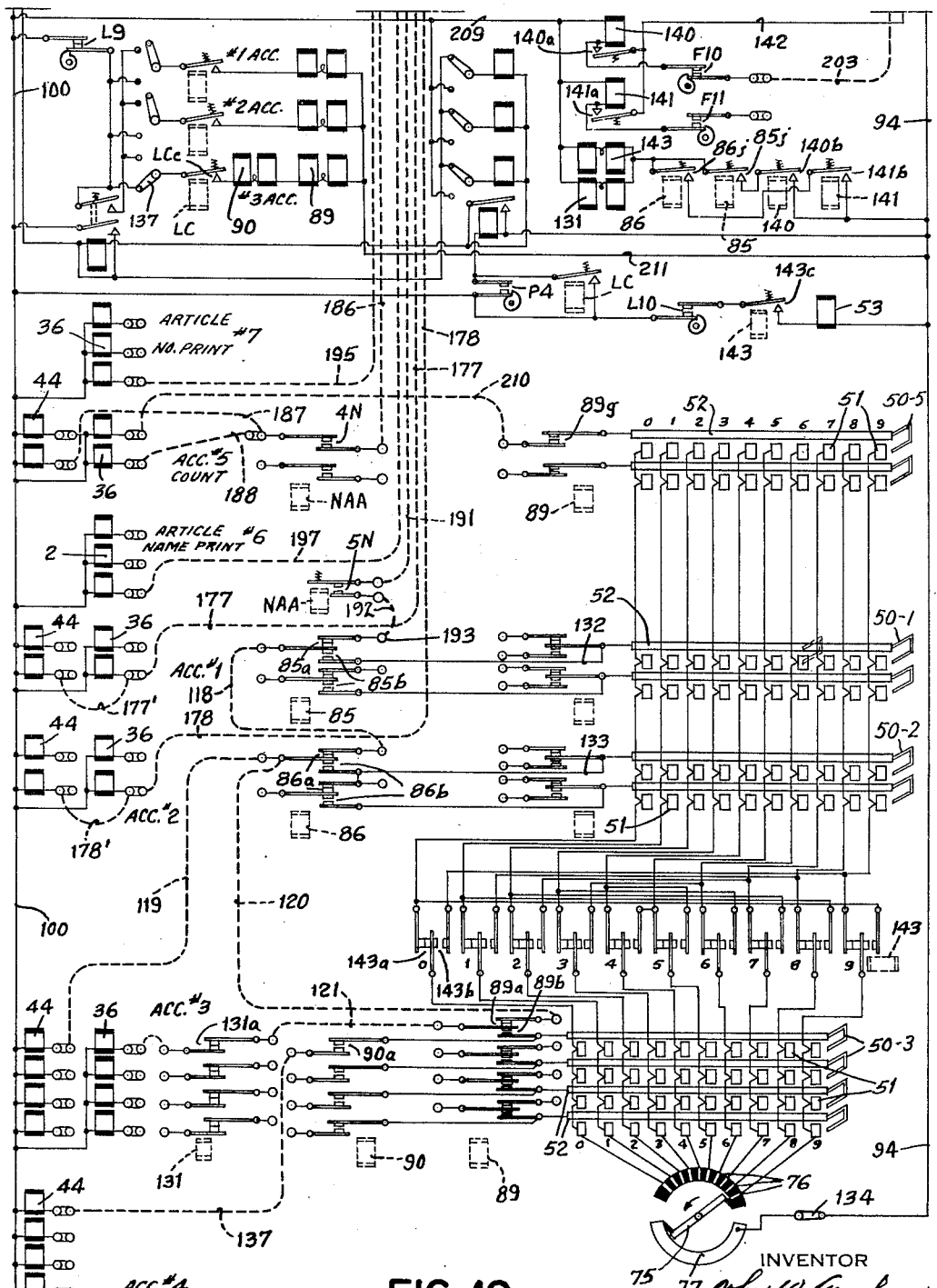

Pawl 7 is controlled by magnet 2 which, when energized, attracts associated armature 10 which is pivoted at 11 and connected to cause movement of a call wire 12 toward the right to rock latch 13 counterclockwise, releasing pawl 7 which thereupon under spring action rocks clockwise to intercept a stop 5 on type bar 3. Each magnet 2 is wired directly to a lower analyzing brush LB as seen in Figs. 10b and 10c.

The upper set of stopping pawls 9 is carried by a vertically movable crosshead 14 which slides on posts 15. Crosshead 14 and pawls 9 are adapted to be moved downwardly after the lower analyzing brushes LB have analyzed the index point positions 9 to 0 of the record card. During the period that the index positions 0, X and R are passing the lower brushes, a perforation encountered by the brushes at this time will cause energization of the magnet 2 a second time, which operates latch 13 so that an offset projection 16 thereon, strikes the lower arm of a latch 17 and rocks it to release the pawl 9 as it is moving downwardly. The pawl 9 will thereupon engage with a stop 8 of the type bar and move it down, one, two or three steps, depending upon the location of the upper alphabet control perforation in the record card. Thus each alphabet type bar 3 is moved to a selected one of the letter printing positions according to the position of two code perforations in a column of the record card R.

Numeral printing is carried on in a more simple fashion as revealed with reference to Fig. 6. Slidingly mounted in the crosshead 28 are type bars 29 spring urged into movement with the crosshead as it rises. As type bar 29 moves upwardly, ratchet teeth 30 successively pass the nose of stopping pawl 33 as the type elements 31 successively pass printing position opposite platen 1. Energization of printing magnet 36 as the type bar moves upwardly will draw call wire 35 toward the right to rock latch 34 out of engagement with stopping pawl 33 whereby the nose of the latter will engage one of the teeth 30 and interrupt further upward movement of the type bar. The upward movement of the type bar is synchronized with the movement of the record card R past the analyzing brushes, and a perforation sensed by the brushes will energize the magnet 36 to interrupt the type bar with the type element 31 corresponding to the value of the digit represented by the analyzed perforation, in printing position. Before the crosshead 28 moves downwardly, the usual printing hammers are tripped to take an impression from the selected type elements.

The adding mechanism is generally similar to that shown and described in the patents referred to and the description thereof will accordingly be limited to a brief explanation of its manner of operation. The accumulator drive shaft 37 (Fig. 7) is directly geared to a pulley shaft connected by a belt to the motor TM as in Patent 1,976,617 so that it is in operation as long as the driving motor of the machine functions and the driving ratio is such that shaft 37 makes one revolution for each card feeding cycle of the machine. Shaft 37 has slidably mounted thereon, but keyed for rotation therewith, a clutch element 38, one for each denominational order of the accumulator. The element 38 is provided with a groove in which fits the end of the short arm of the lever 41 which is pivoted as shown and provided with a block 42 normally held by armature latch 43 of adding magnet 44. A leaf spring 45 bears against the extremity of the longer arm of lever 41 and moves the same in a counterclockwise direction upon release of block 42 by armature 43. This movement will bring clutch member 38 into engagement with cooperating teeth 39 integral with a gear 40 loosely mounted on shaft 37. Gear 40, when thus coupled to shaft 37, will rotate a gear 46 which meshes therewith and will adjust the accumulator index wheel 47.

The rearward extremity of member 41 is adapted to be engaged by a finger 48 toward the end of the cycle for the purpose of disengaging clutch element 38 from teeth 39 and re-latching block 42 on armature 43.

Briefly summarizing the adding operation, the magnet 44 may be energized at various points in the cycle of the machine, depending upon the location of a perforation in a column of the record card analyzed by the lower brushes LB. This energization may take place in response to a perforation in any of the index point positions from 9 to 1, inclusive. A perforation in the 9 index point position will trip the clutch element 38 nine steps before finger 48 is operated to de-clutch it, and a perforation in the 1 index point position will trip the clutch element 38 one step before it is de-clutched by the finger 48. Each step of clutching engagement corresponds to a tenth of a revolution of the accumulator index wheel 47 so that a "9" hole will move it nine tenths of a revolution and a "1" hole will move it one-tenth of a revolution. The manner in which circuits through the lower brushes control the operation of magnet 44 will be set forth in connection with the explanation of the circuit diagram.

Read-out and total taking devices are associated with the accumulator wheels. They are in the form of electrical contact devices for sensing the amount standing on the accumulator wheels after addition has taken place.

Driven by gear 40 (Fig. 7) is a gear 49. Since the ratio of gears 49 and 40 is 2:1, the former will turn through a half revolution for each revolution of the latter. Carried by, and insulated from, gear 49 is a pair of electrically connected brushes 50, one of which cooperates successively with ten conducting segments 51 while the other cooperates with an arcuate conducting strip 52. The relationship of the parts is such that when the index wheel 47 is in its zero position, one of the brushes 50 is in contact with the zero segment 51 and the other brush is in contact with the strip 52, thus forming an electrical connection between the two.

If the wheel 47 is displaced to indicate, say, 8, then one of the brushes 50 will be in contact with the "8" segment 51 and the other brush will be in contact with the arcuate strip 52. The positioning of the brushes 50 provides a convenient electrical read-out mechanism for controlling total transferring and total printing operations and the electrical circuits involved in these functions will be more fully explained in connection with the circuit diagram.

During certain subtracting operations it is necessary to add the so-called fugitive or elusive one into the units order of one of the accumulators. The mechanism by means of which this elusive one is entered into the accumulator is illustrated in Fig. 8 where the units order index wheel 47 has associated therewith a magnet 53 the armature 54 of which is secured to the carry lever latch 55 of the units order so that energization of magnet 53 will trip the units pawl carrying arm 56, whereby, during the carrying portion of the machine cycle, the pawl 57 associated with the units order will advance the units index wheel 47 one step.

The shaft 58 (Fig. 7) upon which the index wheels 47 of an accumulator are loosely mounted is slotted for cooperation with spring-pressed pawls (not shown) pivoted upon and carried by the individual index wheels in such manner that counterclockwise rotation of shaft 58 will engage and drive the index wheels 47 forwardly to zero position during a single revolution of shaft 58.

The foregoing portion of the description is concerned mainly with the usual electrical and mechanical features found in the accounting machine. From this point on, the specification refers in greater detail to the novel features of the present invention.

Figs. 11 and 14 are views showing the arrangement of a store in which the dispensing controls are employed; Fig. 11 being a sectional elevation view and Fig. 14 being a plan view. The section shown in Fig. 11 is taken at about the center of the store at the point where the accounting machine stands in the center of the radiating chutes.

Fig. 11 shows that the store is lined with three rows of compartments 20 around the outer walls 21, and two rows of compartments 22 in recesses in inner walls 23. Inside each compartment is an articles M displayed behind a locked glass door 25 which the proprietor may open to rearrange the display. Beneath each compartment is an open ended shelf 26 bearing a plurality of record cards Ra related to the article on display directly above them. These cards are to be selected by the customers who are free to wander about and select the kind and quantity of merchandise they desire by merely taking one or more cards from the piles under the various display compartments. It is also contemplated that in an alternative method of card selection, no sample articles be displayed, and instead, only cards Ra be exhibited; then relying on the pictures on the cards to aid the customer in identifying and selecting the merchandise he desires.

After the customer has selected all the items he desires, he then goes to the center of the store and hands his selected series of cards to a clerk standing at the accounting machine A. The clerk then puts the cards into the accounting machine, starts the machine, and then steps to the semicircular table T to gather the articles as they slide down a series of chutes 27 from the hoppers H on the second floor S. The table T is formed with two bumper rails 60 and 61 under which receiving platforms 62 and 63 radiate out under the open ends of the chutes 27 which are arranged to end alternately in two tiers to reduce the area that the clerk must explore in gathering the merchandise relating to each sale. The more fragile items may be situated over the chutes sloped at the more gradual incline. The inner part of the table T is provided with a shelf 64 over which the clerk may slide a basket 65 or a bag for gathering the items while moving from right to left. If the order is a small one, it may be placed in a bag so that the customer may go directly to a cashier C, Fig. 14, after receiving the receipt Rt, Fig. 5. If the order is large and bulky, the items are assembled in a basket and carried to a wrapping table WT, Fig. 14, in the path to the cashier.

The door to the store is of the divided entrance and exit type, and the path that the customer follows in leaving the store is confined by partitions to facilitate operation of the system. The customer enters at E and is then free to walk about and gather cards as long as he wishes. After finishing his selection of cards he appears at F ready to receive the goods that the cards represent. A low partition 66 guides him over to the packaging position P after which another partition 67 leads up to the leaving position L at which the cashier must be paid before going out of the store. A partition 68 also acts as a guide to the exit, and it is formed with an emergency door 69 which opens out of the area B.

The cashier may be placed at the position C' at the head of the wrapping table WT, in which event the partition 71 is erected.

An elevator EL is provided to carry the merchandise to the second floor where it is placed in the hoppers H. Two kinds of hoppers are shown; the form Hs, Fig. 12, being used to dispense square or rectangular packages which may contain bottles or containers of any shape, while the other form Hr, Fig. 13, is adapted to handle round articles such as canned goods.

As shown in Fig. 14 the hoppers are arranged side by side in three lines forming an open ended square from which depends the chutes that converge down onto the table T. Each hopper is secured solidly to the floor of the second story by means of a bracket 72, Fig. 11, so that it is held with a flared open end at the top in which articles may be placed to make the stock available. The chutes 27 project down through slots cut in the floors of the second story. Although the chutes 27 are shown as completely enclosed units it is evident that the tops and sides may be left off for more economical construction. It is also contemplated that a single sloping and converging surface may be erected under all hoppers to convey all articles to the lower floor.

Ample space is provided around the hoppers on the second floor so that it may be used for the storage of cases, cartons, barrels, etc., of the goods to be dispensed. There is also room for a number of clerks who will constantly refill the hoppers as articles are withdrawn therefrom.

In the hopper Hs, Fig. 12, is pivoted a wheel 73 with four vanes for holding and dispensing the square packages M, one by one. This wheel 73 is pivoted on a shaft 74 with bearings in bracket 72 and it carries a pinion 78 meshing with a gear 79 mounted on a shaft 80 also fulcrumed in bracket 72. Gear 79 is secured to a ratchet wheel 81 with teeth that are engaged by an operating pawl 82 and a detent 83. The pawl 82 is pivoted on the lower end of an armature lever 84 pivoted at 59 and operated by a hopper control magnet 9D. Every time the magnet 9D is energized, lever 84 is rocked counterclockwise, ratchet 81 and gear 79 are turned counterclockwise one tooth space, and pinion 78 and wheel 73 are turned 90° in a clockwise direction to release one square package M so that it may slide down the chute 27. Spring 144 restores the operating pawl 82 and brings the lever 84 against a stop stud 145 when the magnet 9D is deenergized. As wheel 73 turns to slide a package M off one vane, the next vane passes under the following package to support it ready for dispensing.

As long as one or more packages remain in the hopper, a pair of package lever contacts PLC9 will be closed because the inner spring blade of the contacts tends to open the contacts but is prevented from doing this by an extending insulation button thereon contacting with the bottom package M.

The hoppers Hr, Fig. 13, are constructed in a different manner to handle round objects such as cans. A four vaned wheel 146 is pivoted on a shaft 147 supported in the bracket 72. Attached to wheel 146 is a toothed escapement disk 148 cooperating with an escapement release pawl 149 and a stop pawl 150, both pawls being loosely pivoted on stud 151. The lower end of pawl 149 is formed as an armature which is attracted by the hopper control magnet 1D. The weight of the articles in the hopper tend to turn the wheel 146 in a counterclockwise direction, but such movement is normally prevented by the pawl 149 in engagement with one of the four teeth on disk 148. However, when magnet 1D is energized, pawl 149 is rocked in a clockwise direction to release disk 148 so that wheel 146 may turn. As pawl 149 moves away from the disk, a spring 152 thereon, pulls the other pawl 150 towards the disk so that its end is in position to abut against one of the teeth on the disk after it has turned almost a quarter revolution and dropped one of the cans M in the chute 27. As the wheel 146 turns, a second can settles at the bottom of the hopper between two of the vanes. When magnet 1D is deenergized, a spring 153 urges pawl 149 in a counterlcockwise direction so that the hooked end of the pawl engages the next tooth on disk 148 as the pawl is brought into the home position against a stop pin 154. At the same time that pawl 149 is being rocked into engagement with disk 148, a lug 155 on pawl 149 engages pawl 150 and depresses it out of engagement.

A pair of package lever contacts PCL1 are mounted on hopper Hr to sense the presence of articles in the hopper. The contacts are held closed until the supply of articles is exhausted.

Figure 3:
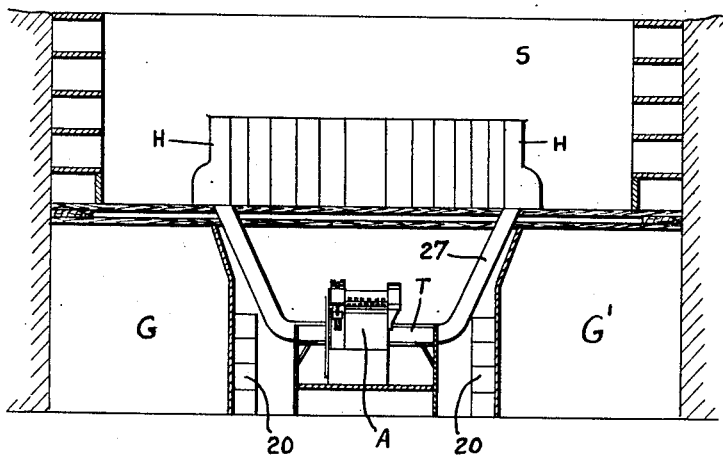
Fig. 3 is a front elevation view or diagrammatic representation of a retail store arranged according to the present invention with a small lower floor area and a larger upper story for containing stock. A system of hoppers and converging chutes connect the two floors.

Fig. 3 is a diagrammatic view showing that the disclosed store system saves the valuable ground floor spaces G and G' which are usually the costly rental areas in a building. This is possible because the lower floor display is only one of a kind while the bulk of the merchandise is stored in a large area on the second floor ready for dispensing through the hoppers H. Figs. 11 and 14 disclose another form of store arrangement wherein the entire lower floor is used for display, wrapping and accounting purposes.

Figure 9:
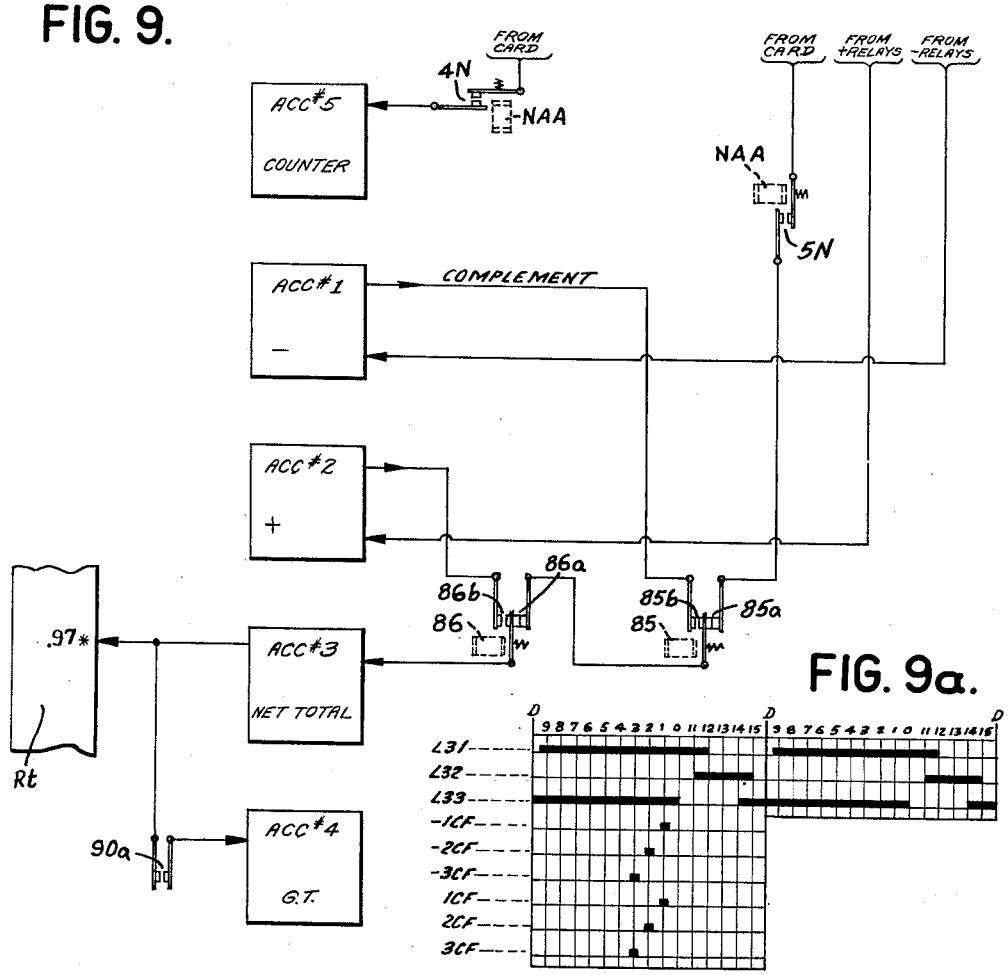
Fig. 9 is a diagram showing the steps of operation used in accumulating a net total after transferring positive and negative price variation amounts.

Before discussing the operating controls of the machine which are shown in detail in the wiring diagram, it is believed advisable to first outline the general operation of the machine with reference to the diagrammatic showing in Fig. 9. There it is seen that the data to be computed and printed comes from four sources to be added into five accumulators. ACC#1 receives and adds the negative or reduced price variations, ACC#2 receives and adds the positive or advanced price variations, ACC#3 not only receives and adds the basic price data directly from the card, but it also has transferred thereto the complement of the total of negative price variations and the true amount of the total of the positive price variations so that it may compute the net total price; ACC#4 receives and adds all net total prices to compute a grand total of sales, and ACC#5 is provided to add the quantity of articles comprising each sale. The number punched in the "Quantity" field on the card R, Fig. 1, is directed into ACC#5 (Fig. 9) through a pair of contacts 4N which are closed only if an article is in the selected hopper ready to be dispensed. The number in the "Price" field on the card is entered into ACC#3 through contacts 5N, which are also closed only if an article is actually delivered, and through normally closed contacts 85a and 86a. ACC#1 receives and adds 1¢, 2¢ and 3¢ amounts from negative price variation relays which are set up as described hereinafter. ACC#2 adds 1¢, 2¢ and 3¢ price variations received from positive price relays. Entries are made in this manner for each succeeding card and then at the end of a group, transferring operations take place to transfer the amount in ACC#1 to ACC#3 in the form of a complement, and then transfer the amount in ACC#2 to ACC#3. During a price transfer cycle, the amount in ACC#1 is entered into ACC#3 through contacts 85b which are closed in response to an "X" perforation in the card column 22, Fig. 1. A perforation in the X position of card column 79 will cause the amount in ACC#1 to be subtracted from ACC#3 by the addition of its complement. In a similar manner the amount in the plus price variation accumulator #2 is entered into ACC#3 through contacts 86b closed as controlled by an "X" perforation in the 80th column on the card. After all transferals have been made, ACC#3 will contain a summation which may be shown diagrammatically as:

$$ACC\#3 - ACC\#1 + ACC\#2$$

As the quantity, price and price variation items are entered into the various accumulators they are also printed on a customer's receipt Rt, Fig. 5, and a proprietor's record sheet PR. During the transfer cycles, printing is suppressed but may be effected in a known manner if desired. The total count of the quantity of articles and the net total sales price are printed as shown at the bottom of the record slips in Fig. 5. During the cycle in which the total is printed, a transfer operation takes place to introduce the net total amount into the grand total accumulator ACC#4 since contacts 90a are then closed, and following this the other four accumulators are reset in readiness to receive data from the next group of cards. In the operation of the machine the usual "group control" devices are utilized to initiate a minor total taking cycle of operations which includes the transfer cycles.

The wiring diagram shown in Figs. 10, 10a, 10b and 10c, discloses the electrical controls for governing the operation of the accounting machine which is the nucleus of the dispensing system. The ordinary starting and operating control circuits are set forth in detail in the Patent 2,126,-621 previously referred to, therefore, it is believed unnecessary to describe them again. However, all circuits influencing the operation of the novel devices of this invention are explained hereinafter.

Turning to Fig. 10a it is seen that the hopper control magnets 0D, ID, 2D, etc., are connected to the upper brushes UB through an impulse timer IT. The outer cylindrical insulation shell 157 of the timer is stationary, but through the center there runs a shaft 158 carrying a series of brush holders 159 insulated therefrom. The shaft 158 is connected to a gear 160 which meshes with the gear 37g that is turned only during card feeding operations. During the time that the 9-0 index points on the record card R are passing under the upper brushes UB, each brush holder 159 is turned in synchronism therewith to wipe over a common contact sector 161 and a series of ten contact spots 162. To each of these contact spots 162 is wired one of the hopper magnets 9D, 8D, or 7D, etc., so that if a related perforation is sensed by the upper brush, a circuit is directed through the brush, the timer and the certain magnet. For example, when a "9" perforation is in a column on the card, that is sensed early in the cycle while the brush holder ends are touching the spot in series with the hopper magnet 9D.

As many brush holders 159 and sets of spots 162 may be provided on the timer IT as desired, depending on the number of hoppers to be used. For each set of ten hopper magnets, there must be allotted ten spots 162, one brush holder 159 and one upper brush UB. As shown in Fig. 1, the "Article selection" field of the card R is spread over fifteen columns of index points each with ten regular 9-0 index points. This capacity calls for 150 hopper magnets, and the use of 15 upper brushes with the corresponding number of elements on the timer IT.

More than one hopper may be operated during a single cycle. Using the card shown in Fig. 2a, wherein four perforations are in the left field, four hoppers would be operated during the same cycle to dispense a combination of four different articles. A plurality of article selection perforations may be punched in the same column and they will control the proper hoppers through the timer IT.

In series with each of the hopper magnets is a related one of the package lever contacts PLC that are closed when one or more articles are in the hopper. As shown in Fig. 12, the hopper operated by magnet 9D is provided with contacts PLC9 which are in series therewith, Fig. 10a, and open when the hopper is empty to prevent direction of an electric circuit therethrough.

Also in series with each of the hopper magnets is an adjustable price variation contact lever 164 which the store proprietor may set to any one of seven positions. Associated with the wiping end of lever 164 is a set of seven contact bars 165—171 arranged in an arcuate formation about a shaft 172 carrying the levers 164. These levers are insulated from the shaft and from each other, but they are wired separately in series with related hopper magnets and package contacts. Normally the lever 164 is centralized to contact with the middle bar 168 which does not call for any price variation control. If a lever is grasped and rocked clockwise it contacts successively with the bars 166, 167 and 168, separately connected to the pickup relays +IP, +2P and +3P, respectively, relating to an increment of 1¢, 2¢ or 3¢ on the price to be charged. Movement of the lever counterclockwise, establishes contact with the bars 169, 170 and 171 connected to the pickup relays —IP, —2P and —3P, respectively, for selecting a decrease of 1¢, 2¢ or 3¢ in the price to be added. Of course other bars and pickup relays may be added to give a wider range of price variation control, or the relays may serve to control the adding and subtracting of values other than penny amounts. Assuming that there are 150 hoppers in the system, then there are 150 price variation levers 164 each in series with a related hopper magnet and adjustable to vary the price of the article in the hopper three cents either way.

It is contemplated that these 150 levers 164 may be mounted on a panel secured to the accounting machine and located behind a locked door so that only the proprietor or store manager has access thereto to effect price changes in accordance with announced sales or advancing costs. In Fig. 5 it is seen that the price changes are recorded at the right side of the receipt and record sheet so that the customer is apprized of prices other than those punched in the record card. The levers 164 may also be used as hopper disabling means by moving them clear of all the contact bars.

Only one set of six price variation relays are needed because only one price is printed and added at a time. When combinations of more than one article are selected simultaneously, a single price is punched on the card selecting the articles and this price may be changed by adjusting any of the levers 164 relating to one of the articles of the combination. The three pickup relays —IP, —2P, and —3P control the addition of 1, 2 or 3 in accumulator #1, and the other pickup relays +IP, +2P and +3P control the adding of 1, 2 or 3 in accumulator #2 in a manner explained hereinafter.

A non-add and non-print control is provided to prevent the adding and amount printing functions when no article is dispensed, due either to the card being unpunched in the selection field, or the hopper being empty, or the lever 164 of a selected hopper being moved to the disabling position. This control takes the form of a nonadd pickup relay NAP, Fig. 10a, in series with all of the hopper magnet and variation pickup relay circuits. If any one of the hopper magnets are energized, then the non-add relay NAP is also energized to enable the adding and printing of the quantity and price numbers in a manner explained more fully hereinafter.

A few circuits may be followed through the combined hopper magnet, price relay and non-add relay controls in Fig. 10a to illustrate their functioning in a definite manner. Assuming that a card with a "9" perforation in the extreme left column is being sensed under the upper brushes, and the controls are set as seen in Fig. 10a, then the following circuit is established: from line 100 through contacts L12, common contact brush 173, contact roller 174, left upper brush UB, socket 175, sector 161, brushes and holder 159, "9" spot 162, hopper magnet 9D, lever contacts PLC9 (closed because an article is in the hopper), left lever 164, bar 165, wire 176 which is free of price variation relays, contacts UCLe (closed by upper card lever magnet UCL as long as a card is under the upper brushes) relay NAP and line 94. Thus the "9" hopper is operated and the relay NAP makes effective the adding and printing of the quantity and price without a price variation. If the card should contain an "8" perforation at the left, then the circuit follows a path from line 100, through contacts L12, brush 173, roller 174, left upper brush UB, socket 175, sector 161, brush holder 159, "8" spot 162, hopper magnet 8D, closed contacts PLC9, lever 164 second from the left, set for a price variation of −1¢, bar 169, pickup relay −IP, contacts UCLe, relay NAP and line 94, thus the "8" hopper is operated, relay −IP initiates a price variation of minus one cent and relay NAP enables addition and printing of the quantity, price and price variation. If the card contains a "7" perforation at the left, then a circuit cannot be established through hopper relay 7D because the "7" hopper is empty as indicated by the open condition of contacts PLC7. Not only is relay 7D held deenergized, but the non-add relay NAP is also not activated and therefore it fails to call for amount adding and printing operations with the result that the price and quantity of article "7" does not enter into the final total and count. Although relay NAP controls price and quantity printing, it does not control name and identification number printing which takes place invariably as the cards pass the lower brushes (see the recording of the last item in Fig. 5).

Figure 9A:
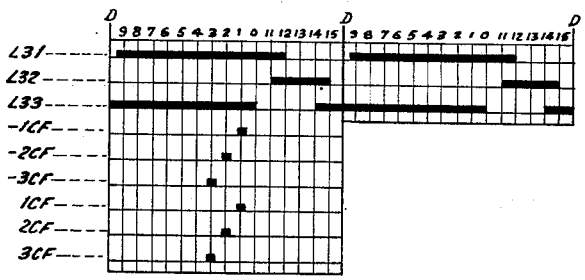
Fig. 9a is a timing chart of the new cam contacts used in the machine.

Since the operation of the price variation pickup relays and the non-add pickup relay occurs while the card is passing under the upper brushes, and since adding and printing from said card is effected one cycle later while the card is sensed under the lower brushes, means must be provided to hold over or maintain the controls effected by the relays and at the same time free them for subsequent operation by a following card. This holding means is provided in the form of three sets of sequentially operated and released holding coils, each set in series with one of the cam contacts L31, L32 and L33. Reference to the time chart in Fig. 9a shows that contacts L31 are held closed while the index points are being analyzed by the upper brushes, then contacts L32 close before contacts L31 open to sustain the picked up reading after contacts L31 open. Near the end of the cycle, contacts L33 close before contacts L32 open, and they remain closed during the index point analysis portion of the next cycle so that as the card passes the lower brushes, amounts thereon may be added and printed and related price variations may be added and printed.

At the center of Fig. 10a it is seen that in series with contacts L31 and in parallel with each other are a group of holding coils −3H, −2H, −IH, IH, 2H, 3H and NAH, each with a pair of pickup contacts operated by the relays −3P, −2P, −IP, +IP, +2P, +3P, and NAP, respectively. Momentary energization of any of the pickup relays results in closure of the related contacts and sustained energization of the related holding coil through contacts L31. This would not be held long enough, so any of coils −3H, −2H, etc., that are energized then serve to pick up other coils −3I, −2I, etc., which are held by cam contacts L32 so that coils −3H, −2H, etc., may be deenergized and made ready for a new pickup cycle.

An energized one of the coils −3I, −2I, etc., immediately closes contacts in series with one of another set of coils −3A, −2A, etc., in series with contacts L33 which are closed during the adding cycle. This serves finally to set up a means whereby amount and price variation addition may be controlled.

The decreasing price variation relay coils −IA, −2A and −3A, Fig. 10b, control contacts −Id, −2d and −3d which are connected by plug wire 177, Fig. 10c, in series with the units order adding magnet 44 and printing magnet 36 of accumulator #1. The circuit through wire 177 is timed differentially by cam contacts −ICF, −2CF and −3CF, one of which may be made effective selectively by the closure of related relay contacts −Id, −2d or −3d. Referring to Fig. 9a it is seen that cam contacts −ICF are timed to close at the "1" time to control the adding and printing of unity; contacts −2CF are controlled to close at "2," and contacts −3CF are arranged to close at "3." By means of these connections, one, two or three units may be added and printed by the units order of accumulator #1.

In a similar arrangement, the increasing price variation relay coils IA, 2A and 3A, Fig. 10b, selectively close contacts Id, 2d or 3d which are connected by plug wire 178, Fig. 10c, in series with the units order adding magnet 44 and printing magnet 36 of accumulator #2. An impulse through wire 178 is timed by cam contacts ICF, 2CF and 3CF, one of which may be made effective by closing related connected relay contacts Id, 2d or 3d. In Fig. 9a it is shown that contacts ICF are timed to close at the "1" time, contacts 2CF close at "2," and contacts 3CF close at "3." Thus, one, two or three units may be added and printed by the units order of accumulator #2.

At this point it is well to trace the train of events following the energization of a certain price variation pickup relay. It will be remembered that when the hopper magnet 8D, Fig. 10a, was energized, pickup relay −IP was also activated because the related lever 164 is set on bar 169. Relay −IP then closes contacts −Ia to set up a circuit through the holding coil −IH. The circuit includes line 100, wire 179, coil −IH, contacts −Ia, cam contacts L31 and line 94. Holding coil −IH then closes contacts −Ib to energize an intermediate holding coil −II by a circuit through line 100, wire 180, coil −II, contacts −Ib, cam contacts L32 and line 94. All the foregoing events, resulting in the energization of coil −II, occur while the card is passing under the upper brushes. Now, in order to pass the control over to the next cycle, coil −II closes contacts −Ic in series with another holding coil —IA. The circuit then closed includes line 100, wire 181, coil —IA, contacts —Ic, cam contacts L33 and line 94. Coil —IA is held energized during the adding portion of the cycle to close contacts —Id, Fig. 10b, so that cam contacts —ICF may be effective to create an impulse at the "1" time. Thus, a unit is added by ACC#1 and printed under control of an impulse carried by line 94, lower card lever contacts 130, Fig. 10, wire 125, Fig. 10b, cam contacts —ICF, contacts —Id, plug wires 177, 177', the units order adding and printing magnets 44 and 36 of ACC#1, and line 100. A minus sign, Fig. 5, may be printed along with negative price variations, and an & sign may be printed with positive price changes, either by enlarging the type face or by providing a special type bar stopped in the usual way.

It is believed unnecessary to go into detail with regard to the way the other five price changes may be added in ACC#1 or ACC#2. The relay coil and contact notation follow in regular order down the wiring diagram as a guide to the selective addition of 1, 2 or 3 cents in either accumulator.

Returning again to consideration of the non-add control involving relay NAP, Fig. 10a, which is noted as being energized when any hopper magnet is activated, this relay operates coil NAH which in turn operates the coil NAI that effects energization of coil NAA. This latter coil is sustained in operation during the adding cycle by the closure of cam contacts L33. Coil NAA, Fig. 10c, then closes contacts 4N and contacts 5N to make effective the adding of the quantity number by ACC#5 and the adding of the price amount by ACC#3. Should relay NAP remain deenergized for any reason, as noted hereinbefore, then coil NAA also is ineffective and contacts 4N, 5N remain open to prevent adding and printing of the quantity and price.

At this point the circuits for carrying the quantity and price impulses may be traced from the lower brushes LB to the accumulators ACC#5 and ACC#3. Starting with line 94, Fig. 10, and continuing through contacts 130, the quantity impulse circuit includes wire 125, wire 182, Fig. 10b, impulse distributor contacts 126, cam contacts FI, common brush 183, roller 184, lower brush LBQ which senses the third card field from the left, Fig. 1, to plug socket 185, Fig. 10b, plug wire 186, Fig. 10c, contacts 4N, plug wires 187 and 188 to the adding magnet 44 and printing magnet 36 of the units order in accumulator #5, and thence to line 100. The price control circuits are the same as the quantity circuit down to the lower brushes LB79 and LB80, Fig. 10b, which sense the card field at the right in Fig. 1, then from brush LB80, Fig. 10b, the circuit continues to plug socket 189, and through plug wire 191, contacts 5N, Fig. 10c, wire 192, socket 193, contacts 85a, plug wire 118, contacts 86a, wire 119 to adding magnet 44 and line 100. A parallel connection 120 extends to contacts 89a and from these to a plug connection 121 to contacts 131a and thence to printing magnet 36 of the units order in accumulator ACC#3 and over to line 100. All the other orders of ACC#3 are connected in a similar fashion. Through the aforementioned connections the machine is adapted to print the numbers in the "Quantity" and "Price" columns, as shown in Fig. 5.

Two other groups of lower brushes are used to sense card fields and control the printing of the article number and the article name. A few brushes including brush LB22, Fig. 10b, sense the second field from the left, Fig. 1, and control printing magnets 36 in a bank #7 over circuits that are the same as a previously described circuit down to brush LB22. There the number perforations are sensed and the circuit continues to plug socket 194, through plug wire 195, print magnet 36 in bank #7 and line 100. This control serves to print article numbers in the second column from the left in Fig. 5. The name brushes LBN sense the code perforations in the second field from the right, Fig. 1, and control alphabet printing magnets 2 in bank #6, Fig. 10c. The part of the circuit from lower brush LBN down, passes to socket 196, through plug wire 197, alphabet magnet 2 in bank #6 and line 100. A plurality of such circuits govern the printing of the words and abbreviations shown in the "Name" column on the sheets in Fig. 5.

Devices are provided whereby the operator of the machine may set up a customer's number to be printed on the records and identify the person receiving the articles delivered out of the hoppers. This printing control is especially useful in keeping a record of charge and C. O. D. sales, but may be omitted when handling cash sales. An example of customer number printing is shown at the left on the record sheet PR in Fig. 5. A plurality of such record sheets PR and similar bills may be printed at the same time by providing such sheets with interspersed carbon sheets that are wider than the carbon sheet CN.

Referring to Fig. 10b, it is seen that the customer numbering device includes an emitter E and a series of adjustable contact levers 198, 199 and 200 which are settable to select certain of the number representing impulses sent out by emitter E. The insulation shell 201 of the emitter is stationary but the brush 202 is fastened to the listing cam 21' (Fig. 4) which is rotated on each card printing cycle. In turning, brush 202 contacts successively with contact spots connected to a set of bus bars 203 provided with sets of arcuately arranged contact points 204. The movement of brush 202 coincides with the movement of a card under the lower brushes, and the impulses through the "9" bar 203, "8" bar 203, etc., are suited to control the printing mechanism just as though the impulses were initiated by a card. However, only certain of the impulses are selected according to the adjusted positions of levers 198, 199 and 200 with their ends touching certain of the points 204. The levers are wired to separate plug sockets US, TS and HS from which plug wires may be connected to the units, tens and hundreds order printing magnets 36 in bank #8. The levers 198, 199 and 200, are shown as set to control the printing of the number 168 appearing in Fig. 5. A circuit may be traced through the hundreds order as follows: line 94, Fig. 10, contacts 130, wire 125, Fig. 10b, wire 205, brush 202, the "1" bus bar 203, lever 198, wire 206, socket HS, plug wire 207, socket 208 in the units order of printing bank #8, print control magnet 36 and line 100.

Hereinbefore it has been explained how amounts are entered into the accumulators #1, #2 and #3, now the manner of transferring the complement of the amount in ACC#1 and the true amount in ACC#2 to ACC#3 is to be explained.

Referring to Fig. 10 it is seen that a plug socket 122 is provided from which a plug connection 123 is made to the lower brush LB22, Fig. 10b, associated with card column 22, and if any of the cards of the group contains a perforation in the X position of column 22 a circuit will be completed to prepare the machine for a price reduction operation at the end of the analysis of the entire group.

Although the lower brushes LB22, LB79 and LB80 are shown as serving to sense numeral perforations as well as special X control perforations, it is apparent that they may be used for the control operation alone, and other card columns may be used and other brushes may be plugged to sense the article number and price perforations.

The initial circuit extends from the right side of line 94 (Fig. 10), card contacts 130, wire 125, circuit breakers 126, wire 182 (Fig. 10b), contacts F1, common brush 183, roller 184, through an "X" perforation in the twenty-second column to the lower brush LB—22, socket 194, plug wire 123, socket 122 (Fig. 10), contacts F6, relay magnet 124 and wire 114, to line 100. This circuit is held through contacts 124a by a circuit extending from line 94 through relay contacts 96d, contacts 124a, magnet 124, wire 114, and line 100. Magnet 124 is then adapted to close a second pair of contacts 124c which will set up a circuit upon completion of the analysis of the entire card group as explained hereinafter. A third pair of contacts 124b will also be open at this time; thus an "X" perforation in the twenty-second column of any of the cards in a group will serve to energize relay magnet 124 which thereafter remains energized to control the transferring operation of the reduced price variations from the ACC#1 during a subsequent cycle.

A similar set of circuits is completed to prepare the machine for transferring the increased price variation amount. In this instance, the socket 128 (Fig. 10) is provided and connected by plug wire 201 to the lower brush LB80 (Fig. 10b). This lower brush senses the eightieth column on the card and an "X" perforation in this column will, through cam contacts F5, cause energization of relay magnet 129 whose contacts 129a provide a holding circuit and other related contacts 129b prepare an increased price transfer circuit in the same manner as contacts 124c. Thus the relay magnet 124 is energized for the purpose of transferring the amount in ACC#1 to ACC#3 and relay magnet 129 is energized to operate related contacts to transfer the amount in ACC#2 to ACC#3.

In the following section it will be assumed that the machine is to perform successive price reduction and price increase transferring operations upon the completion of the analysis of the group of cards and the various steps involved in these operations are about to be explained.

After the last card of a group has been analyzed and the data thereon properly entered, the group control mechanism GC (Fig. 10) operating in a well known manner will cause deenergization of relay magnets 92, 107, and 108. As the last card of a group passes below the upper brushes, the usual card lever contact, in series with the group control contacts, opens to break the control circuit. Magnet 107 then opens associated contacts 107b in the feed magnet controlling circuit to deenergize relay magnet 111 which, in turn, will open the contact points 111b to deenergize the feed magnet 18 so that card feeding operation will be interrupted. Deenergization of magnet 108 under control of the automatic control devices will cause closure of contacts 108a and a circuit will be completed therethrough upon closure of cam contacts L13 during the latter part of the last card cycle. This circuit may be traced from line 94, through contacts L13, contacts 108a, contacts 124c, magnet 85, and wire 114, to line 100.

The machine is now prepared to transfer the price reduction amounts from ACC#1 to ACC#3. Referring to Fig. 10c, it may be noted that the amount standing in the ACC#1 will be represented by the location of the various brush structures 50—1 which bridge the individual segments 51 and the common strips 52. The emitter shown in the lower right hand side of the figure will have its common strip 77 connected to the right side of the line 94 through the closed switch 134, and impulses will be successively impressed upon segments 76 through the brushes 75 in the order 9, 8, 7, etc., to transmit such impulses to all of the "9" segments 51, all of the "8" segments 51, etc., in succession. Since the price reduction amount in ACC#1 is to be subtracted from the amount in ACC#3, this is effected by entering in the latter accumulator the complementary value of the amount standing in ACC#1. In order that the transfer may be a complemental one, one of the cards of the group is provided with an "X" perforation in column 79 on the card. The special perforation may be punched in the card representing the item involving the price change. This is done so that as the card passes the lower brushes a circuit may be completed from the lower brush LB79 (Fig. 10b) through plug connection 203 and contacts F10 (Fig. 10c) to energize a corresponding control relay magnet 140. Associated with this magnet are contacts 140a which provide holding circuits extending from the left side of line 100, through magnet 140, contacts 140a, wire 142 (Fig. 10), through cam contacts P5 to the line 94. The magnet 140 will accordingly be energized in response to an X79 perforation and will remain energized until total printing operations have taken place.

Magnet 140 has a second pair of contacts 140b (Fig. 10c) connected to contacts 85j. The relationship is such that if a card of the group contains an X22 perforation, indicating that the reduced price transfer cycle is to take place, contacts 85j will be closed in the manner explained hereinbefore and, if an X79 perforation is also sensed, contacts 140b will also be closed so that a circuit is completed from line 94 through contacts 140b, contacts 85j, magnets 143 and 131 and wire 209 to line 100. With these connections made, relay magnets 143 and 131 will be energized during the cycle in which the reduced price amount is to be subtractively transferred and deenergized at all other times. Magnet 131 controls pairs of contacts 131a (Fig. 10c) to open them and prevent printing operations during cycles in which transferring takes place subtractively, since then the amount transferred is a complement and it is usually not desired to print complementary figures. The magnet 143 causes shifting of a pair of contacts 143a and 143b which are wired as shown in Fig. 10c to cause reversal of the impulse connections between ACC#1 and ACC#3. With the switching arrangements in operation, the "9" impulse from the emitter 76, 77 will flow through the zero segments 51 of ACC#1; the "8" impulses will flow through the "1" segments; the "7" impulses through the "2" segments, etc., the segments receiving impulses corresponding to the nines complement value. In this manner, the price reduction amount standing on ACC#1 may be converted into the nines complement and as such entered into ACC#3 to decrease the basic price amount therein.

Assuming that the brush 50—I in the highest denominational order of ACC#1 is set (as indicated in dotted outline) to bridge the "6" segment 51 and a strip 52; at the "3" time in the cycle, therefore, a circuit will be completed from line 94, through switch 134, common segment 77, brushes 75, "3" segment 76, through shifted contacts 143b associated with the "3" segments across the accumulator to the "6" segment in ACC#1, brush 50—1 in the highest order of ACC#1, strip 52, wire 132, contacts 85b, now closed, plug connection 118, contacts 86a, plug wire 119, adding magnet 44 of ACC#3, and line 100. In this manner, the complement of the amount standing in ACC#1 will be transferred to ACC#3 during a single cycle of operation of the machine.

Magnet 143 is provided with an additional pair of contacts 143c (Fig. 10c) which permit the completion of a circuit upon closure of cam contacts L10 to energize the carry lever magnet 53 of ACC#3. As explained above, the energization of this magnet will enter a "1" into the units order of ACC#3 and this "1" is entered whenever a complement is transferred to the accumulator, thus serving to change the nines complement into a true tens complement.

Upon the initial energization of magnet 85 (Fig. 10) a pair of associated contacts 85c will be closed setting up a holding circuit for the magnet traceable from line 94, through contacts P5, L11 and 85c, magnet 85, and wire 114, to line 100. The accompanying closure of another pair of contacts 85d will also permit completion of another circuit when cam contacts L14 close. This circuit may be traced from line 94, through contacts L14, contacts 85d, magnet 96, and wire 114, to line 100. Magnet 96 then operates associated contacts 96e to close a holding circuit which runs through cam contacts P5 so that magnet 96 will remain energized until total printing operations have been performed. A pair of contacts 96d will be opened upon energization of magnet 96, thereby interrupting the holding circuit through the reduced price pickup relay magnet 124 which, in turn, will now permit opening of its contacts 124c and closure of contacts 124b.

A pair of contacts 85g is provided in parallel with the lower card lever contacts 130 (Fig. 10) which are now open since card feeding operations have been interrupted. The function of contacts 85g is to maintain the lower card lever relay magnet LCL energized so that it, in turn, keeps the driving motor in operation.

Contacts 85e are opened during this cycle to prevent the manual initiation of resetting operations and an additional pair of contacts 85h is also opened to prevent the automatic restarting of card feeding operations.

Near the end of the price reduction transfer cycle, from ACC#1 to ACC#3, cam contacts L13 will again close, this time completing a circuit from line 94 (Fig. 10), through contacts L13, contacts 108a, contacts 124b and 129b, magnet 86, wire 114, and line 100. Magnet 86 then closes an associated contact 86c to set up a holding circuit through contacts L11 and P5. A pair of contacts 86d closed thereby will then cause energization of magnet 97 which, in turn, closes contacts 97e to provide a holding circuit through contacts P5. Contacts 97d controlled by magnet 97 will open the holding circuit of the price increase pickup relay magnet 129 so that its contact points may return to normal. Magnet 86, in the same manner as explained in connection with magnet 85, is provided with a pair of contacts 86g for short circuiting the lower card lever contacts 130 to keep the driving motor in operation and it also operates contacts 86e and 86h in the manual reset and automatic start circuits, respectively.

Referring now to Fig. 10c, it is apparent that magnet 86 will open the contacts 86a and close contacts 86b during this second cycle so that transferring may take place from the readout devices of ACC#2 to the adding and printing magnets of ACC#3. The transferring circuit is traceable from the readout strip 52 of ACC#2 to the wire 133, contacts 86b, plug wire 119, adding magnet 44 of ACC#3 and line 100. In this manner the increased price variation amounts standing on ACC#2 will be entered into the adding mechanism of ACC#3. After transferring has been effected, cam contacts L11 (Fig. 10) will open so that magnet 86 will be deenergized and its various contacts will return to the normal positions.

With both magnets 85 and 86 deenergized following the transfer cycles, their associated contacts 85f and 86f will be closed so that since minor control relay magnet contacts are still closed at this time, a circuit will be completed from line 94, (Fig. 10) wire 95, contacts 86f, 85f, 107a, L8, relay magnet 135, magnet LC and line 100. Magnet 135 then closes contacts 135a in the reset magnet circuit and the magnet 70 will therefore become energized and through the mechanism controlled thereby the shaft carrying the cams for controlling the P contacts will function. The first operation to take place will be total printing from ACC#3 and ACC#5 and the concurrent transferring of the total from ACC#3 into the adding magnets of the grand total accumulator ACC#4. For this purpose it is necessary to energize magnets 89 and 90 (Fig. 10c) so that the associated contacts 89b and 90a may be closed to establish the total printing circuit from the readout strip 52 of ACC#3 through contacts 89b, plug connection 121, contacts 131a and print magnets 36, to line 100. At the same time, contacts 89g are closed to establish a total printing circuit from the readout strip 52 of ACC#5 through contacts 89g, plug connection 210, print magnet 36 and line 100.

A parallel circuit extends from the readout strip 52 of ACC#3, through wire 136, contacts 90a, plug connection 137, adding magnet 44 of ACC#4, and line 100. In this manner the net total sales amount in ACC#3 may be both printed and transferred during the same cycle.

Magnets 89 and 90 are connected in series and the controlling circuits therefor are shown in the upper part of Fig. 10c. Magnet LC is energized at the reset time and its contacts LCc are closed to permit the completion of a circuit from line 100, through cam contacts L9, switch 137, contacts LCc, magnets 90 and 89 and wire 211 to line 94. Later in the reset cycle, the usual resetting mechanism comes into play to zeroize the several accumulators in the usual way. In connection with the proprietor's ACC#4, the resetting mechanism is ineffective and the amounts in ACC#4 will continue to accumulate to obtain a grand total of all the entries transferred from ACC#3. ACC#4 is reset by a manual operation at the end of each day or other period of business.

Since it is sometimes desired to have the machine stop after the completion of the resetting operation, switch 138 (Fig. 10) is closed and near the end of the resetting cycle, cam contacts P1 close momentarily to complete a circuit through line 94, wire 95, switch 138, contact P1, relay magnets 139 and 106, and line 100. The holding circuit through contacts 139a and cam contacts L4 holds the magnets energized. Contacts 106a of magnet 106 are in the automatic restoring circuit and, when open, prevent the reenergization of start relay 110. The machine will therefore come to rest at the completion of the resetting cycle of operations and resumption of operations may then proceed through the operation of the start key to close contacts S. This is done by the clerk after he receives another group of cards from a customer and places them in the machine.

In Fig. 5 it is noted that the totals are printed on the record strips in alinement with the quantity and price numbers. After this operation has been carried out, the receipt Rt may be torn off and handed to the customer to accompany the merchandise as it passes the cashier's desk. The other record strip PR is retained on a roll in the machine for reference at the end of each day or any other period.

Although the invention is illustrated and described as applied to a system of dispensing articles in a retail store, it is to be understood that the principles of operation are not confined to such use, but may be employed in manufacturing establishments for requisitioning parts out of stock, or used for dispensing generally. So also with regard to the adjustable price variation feature, this device may be used in any situation where the amount, number or other form of datum on a card is not to be the final figure, but is subject to a change by an increment which may be added to or subtracted from the basic datum on the card as accumulating and recording takes place.

When the devices are used in connection with dispensing parts in a stockroom, the printed sheets (Fig. 5) may be duplicated over the entire width instead of recording on a narrow receipt form, and the data thereon may be identified in a different manner. Instead of printing the customer's number, as shown at the left of sheet PR, the numbers will appear as a workman's number or a job number. The other items will appear in the same manner with the exception of the price and price variation figures which need not appear on the worksheet. Instead the size to which the part is to be machined and the + & — limits may be set up and printed on the sheet which is to accompany the part.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an article dispensing machine controlled by records each of which has price and identification control indicia and related article selection indicia, means for sensing said price indicia, means under control of said sensing means for accumulating said prices, said accumulating means including adding and subtracting devices, means for sensing said identification indicia, means under control of said price and identification sensing means for printing prices and identifications, means for sensing said article selection indicia, a series of dispensing devices for holding articles of different kinds, a set of magnets one for each device to release an article therefrom when energized, a dispensing control circuit under control of said selection sensing means and in which said magnets are selectively energized, a set of price variation relays selectively connected in said dispensing circuit, a series of separate manipulative price variation devices each relating to one of said articles for connecting one of the set of relays for operation with the article releasing magnet in order to set up increase and decrease price variations to be added to or subtracted from the basic price sensed on each record, means under control of the selected relay for operating said accumulating means for adding or subtracting the price variation, a non-add magnet in said dispensing circuit, contacts in series with each of said release magnets, means for operating said contacts to open them when a related dispensing device is empty, and means under control of said non-add magnet when it is deenergized by an open contact for disabling said accumulating means and said price printing means, whereby said identification printing means is alone effective to denote selected but undelivered articles.

2. In an article dispensing machine controlled by records each of which has price control indicia and related article selection indicia, means for sensing said price indicia, means under control of said sensing means for accumulating said prices, said accumulating means including adding and subtracting devices, means for sensing said article selection indicia, a series of dispensing devices for holding articles of different kinds, a set of magnets one for each device to release an article therefrom when energized, a dispensing control circuit under control of said selection sensing means and in which said magnets are selectively energized, a set of price variation relays selectively connected in said dispensing circuit, a series of separate manipulative price variation devices each relating to one of said articles for connecting one of the set of relays for operation with the article releasing magnet in order to set up increase and decrease price variations to be added to or subtracted from the basic price sensed on each record, and means under control of the selected relay for operating said accumulating means for adding or subtracting the price variation when the related article is dispensed.

3. In an article dispensing machine controlled by records, each record bearing data indicia related to one or more different articles to be selected thereby, means for sensing the indicia on the records, a series of dispensing devices each holding a supply of articles of one kind, means under control of said sensing means for operating certain of said devices to dispense the articles represented by the records sensed, printing devices, means under control of the sensing means for operating said printing devices to record the data relating to dispensed articles, means for detecting when any dispensing devices are empty, and means under control of said detecting means for preventing operation of said printing devices when the selected articles are not dispensed.

4. In a dispensing machine controlled by a record having indicia representing a combination of articles, said article representing indicia being in one column of said record, a single sensing brush for sensing said indicia, means in circuit with said brush for converting indicia readings into electrical impulses representative of the articles to be selected, means for feeding records successively past said brush, a series of dispensing holders for holding articles of different kinds, a set of article release means for said holders each with an electrical responsive tripping device, connections between said electrical impulse means and said article reelase means for operating a plurality of tripping devices selected by said indicia, whereby a combination of articles is dispensed in a concurrent automatic flow as controlled by a single sensing brush cooperating with a single column of indicia on a record.

5. In an article dispensing machine controlled by records each having an indicium representing an article to be selected and other related amount indicia, means for sensing the records to detect the article representing indicium, a series of dispensing hopper devices for holding articles of different kinds, a set of magnets one for each device to release an article therefrom, electrical operating control means cooperating with said sensing means, each of said magnets being connected to said control means and selectively energized thereby when the related indicium is sensed, means for sensing said amount indicia, accumulating and printing mechanisms controlled by the last mentioned sensing means to add amounts and print amounts of selected articles, a non-add magnet for making said mechanisms operative only when it is energized, said magnet being connected to all hopper magnets, contacts in series with each of the hopper magnets, and means for causing said contacts to be opened when the related hopper is empty and thus de-energize said non-add magnet to prevent adding of said amount and printing of said amount when selected articles are not dispensed.

6. In an article dispensing mechanism controlled by records, each record bearing indicia representing the price and identification of an article to be selected thereby, means for sensing the indicia on the records, accumulating and printing devices, connections between said sensing means and said devices to operate the accumulating device to add prices and to operate the printing devices to print prices and identifications according to the indicia sensed, a plurality of dispensing devices, each for holding a supply of articles of one kind, means under control of said sensing means for operating a certain device to dispense an article represented by the sensed record, means for detecting the absence of articles in the dispensing devices, and means under control of said detecting means for disabling certain of said connections to prevent accumulating and price printing while maintaining identification printing when a selected dispensing device is empty.

7. In a retailing machine controlled by records with article selection indicia and related price representing indicia, means for feeding said records successively, means for sensing said price indicia, means under control of said sensing means for accumulating said prices, said accumulating means including adding and subtracting devices, means for sensing said article indicia, a series of hopper dispensing devices, each containing a plurality of similar articles, sets of price variation relays related to said articles, a series of separate manipulative price variation devices each relating to one of said articles for selecting one of the related set of relays for setting up increase and decrease price variations to be added to or subtracted from the basic price sensed on each record, means under control of said article indicia sensing means for operating said hopper dispensing devices selectively to release articles called for by the record and for operating the related selected price variation relay, and means under control of the selected price variation relays for operating said accumulating means for adding and subtracting the set price variations to register therein a net total price.

8. In a retailing machine controlled by records bearing indicia representing articles, samples of which are exhibited in association with stacks of said related records, said records being selected manually according to the kind and quantity of articles desired, the combination of means for sensing the indicia on the selected records, a plurality of dispensing devices each holding a plurality of articles of the same kind, means under control of said sensing means for operating certain of said devices to dispense the articles represented by the selected records, means under control of said sensing means for printing a record identifying the articles dispensed and the values of said articles, means for detecting when any dispensing devices are empty, and means under control of said detecting means for preventing operation of said value printing means, whereby value printing is eliminated while maintaining identification printing, when the selected articles are not dispensed.

9. In an article dispensing machine controlled by records, each record bearing indicia representing the identification, price, and quantity of the article or articles to be selected thereby, means for sensing the indicia on the records, a series of dispensing devices holding articles of different kinds, means under control of said sensing means for operating certain of said devices to dispense the articles called for by the records sensed, means under control of said sensing means for simultaneously printing a list recording the identifications, prices, and quantities of the articles dispensed, means for detecting when any dispensing devices are empty, and means under control of said detecting means for preventing operation of said price and quantity printing means when the selected articles are not dispensed.

10. In an article dispensing machine controlled by records, each record bearing indicia representing one or more different articles to be selected thereby, each record also bearing amount indicia relating to the articles to be selected thereby, means for sensing the indicia on the records, a series of dispensing devices each holding a supply of articles of one kind, means under control of said sensing means for operating certain of said devices to dispense the articles represented by the records sensed, an accumulator, means under control of the sensing means for operating said accumulator to add the amounts relating to dispensed articles, means for detecting when any dispensing devices are empty, and means under control of said detecting means for preventing operation of said accumulator when the selected articles are not dispensed.

JOHN W. ARMBRUSTER.